(12) United States Patent
Hedman et al.

(10) Patent No.: US 8,499,489 B2
(45) Date of Patent: *Aug. 6, 2013

(54) METHOD OF KILLING ORGANISMS AND REMOVAL OF TOXINS IN ENCLOSURES

(75) Inventors: David Hedman, Ojai, CA (US); Troy Sears, San Diego, CA (US)

(73) Assignee: TPE Associates, LLC, Anaheim, CA (US)

( * ) Notice: Subject to any disclaimer, the term of this patent is extended or adjusted under 35 U.S.C. 154(b) by 1013 days.

This patent is subject to a terminal disclaimer.

(21) Appl. No.: 10/014,727

(22) Filed: Dec. 10, 2001

(65) Prior Publication Data

US 2002/0066223 A1 Jun. 6, 2002

Related U.S. Application Data

(63) Continuation of application No. 09/321,915, filed on May 28, 1999, now Pat. No. 6,327,812.

(51) Int. Cl.
*A01M 25/00* (2006.01)
(52) U.S. Cl.
USPC .......................................................... 43/124
(58) Field of Classification Search
USPC .................. 43/124, 131, 132.1; 34/82, 84
See application file for complete search history.

(56) References Cited

U.S. PATENT DOCUMENTS

| | | | | |
|---|---|---|---|---|
| 4,817,329 A | * | 4/1989 | Forbes | 43/124 |
| 4,953,320 A | * | 9/1990 | Nelson | 43/132.1 |
| 4,958,456 A | * | 9/1990 | Chaudoin et al. | 43/124 |
| 4,989,363 A | * | 2/1991 | Doernemann | 43/124 |
| 5,058,313 A | * | 10/1991 | Tallon | 43/124 |
| 5,349,778 A | * | 9/1994 | Chu | 43/124 |
| 5,442,876 A | * | 8/1995 | Pedersen | 43/124 |
| 5,768,907 A | * | 6/1998 | Lee | 43/132.1 |
| 5,806,238 A | * | 9/1998 | Brenner et al. | 43/139 |
| 6,141,901 A | * | 11/2000 | Johnson | 43/124 |
| 6,327,812 B1 | * | 12/2001 | Headman et al. | 43/124 |

* cited by examiner

*Primary Examiner* — Isam Alsomiri
*Assistant Examiner* — Valentina Xavier
(74) *Attorney, Agent, or Firm* — O'Melveny & Myers LLP

(57) ABSTRACT

A method and kit of components for destroying organisms and toxins in from an enclosure such as a building. Temperature sensing probes are installed in the enclosure to indicate structure temperature and a recorder is used to record the temperature of said sensing probes in real time. Hot air is introduced into the enclosure through one or more ducts to raise the structure temperature to at least about 120° F., as monitored by the temperature sensing probes. This is sufficient to kill essentially all insects, bacteria, virus, dust mites, spiders, silver fish, fungi and toxic molds such as *aspergillus oryzae, aspergillus terreus, aspergills versicolor, cladosporium hergbarum, stachybotrys chartarum, penicillium aurantiogriseum, pencillium chrsogenum, pencillium glabrum* and *fusarium oxysporum.* and the like. The air can exit through open doors and windows or through ducts to a filter assembly that captures the remains of the organisms. Ozone may be added to the heated air to improve efficiency. Preferably, air when extracted from an egress duct downstream of the filters improves air flow through the enclosure and filters. A typical building can be treated in six to eight hours.

30 Claims, 2 Drawing Sheets

METHOD OF KILLING ORGANISMS AND REMOVAL OF TOXINS IN ENCLOSURES

RELATED APPLICATION DATA

Figure 1:
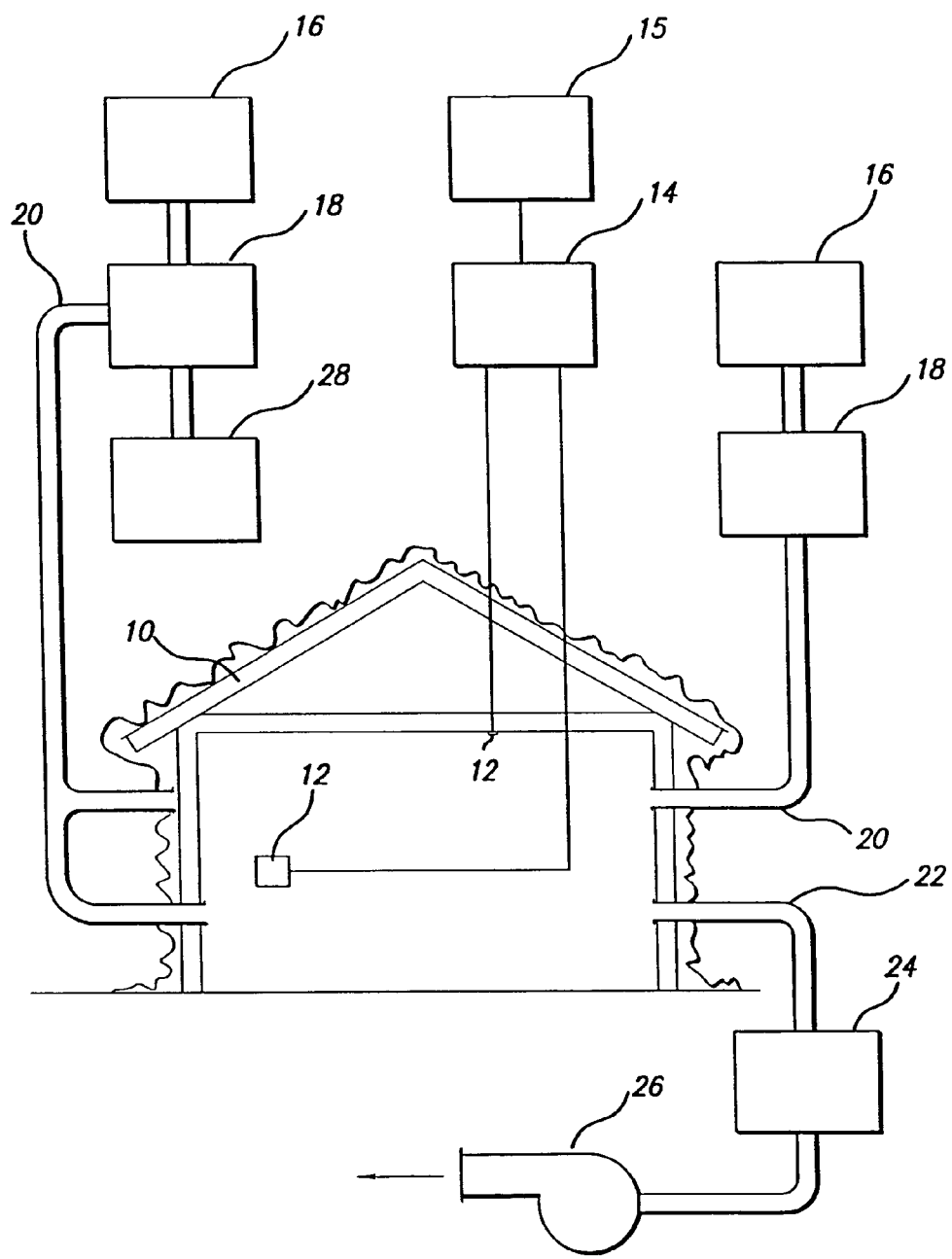

This is a continuation of U.S. patent application Ser. No. 09/321,915, filed May 28, 1999, now issued as U.S. Pat. No. 6,327,812 on Dec. 11, 2001.

FIELD OF THE INVENTION

This invention relates to methods of sanitizing buildings and other enclosed spaces by killing and removing organisms such as insects, bacteria, virus, dust mites, spiders, silver fish, fungi and toxic molds such as but not limited to *aspergillus oryzae, aspergillus terreus, aspergills versicolor, cladosporium hergbarum, stachybotrys chartarum, penicillium aurantiogriseum, pencillium chrsogenum, pencillium glabrum* and *fusarium oxysporum*.

BACKGROUND OF THE INVENTION

A large number of methods have been developed for killing insects, such as termites, in buildings. The most widely used method is tenting the building, then filling the building with a toxic gas for a period of time sufficient to kill termites or other selected insects. This method is effective for killing termites and other insects. However, this method generally requires 12 hours to be effective, requiring building occupants to move out businesses to be closed for approximately a three day period to insure proper venting of toxic material and/or gas. Tenting the building with heavy tarpaulins requires workers to walk and arrange the tarpaulins on the roof, often damaging shingles or other roofing materials. Food and medications must be placed in sealed containers or removed. Generally the entire building must be treated, even if the infestation is localized.

Because of the disadvantages of the toxic gas method, various other techniques of varying effectiveness have been developed, using heated air or very cold air to kill termites, electrical "shock" treatments, irradiation, non-ionizing, etc.

Typical of these is the method disclosed by Charles Forbes in U.S. Pat. No. 4,817,329, in which wood destroying insects, e.g., termites, are killed by applying a heated gas, such as heated air, to wooden surfaces until the building surfaces are heated to a temperature, typically about 120 to 135° F. Temperatures for killing other insects are said to be surprisingly close to this range. This method has been found to be very effective for killing termites. However, this method, using the described temperatures, is not effective for other organisms, such as fungi, and toxic molds such as, but not limited to, *aspergillus oryzae, aspergillus terreus, aspergills versicolor, cladosporium hergbarum, stachybotrys chartarum, penicillium aurantiogriseum, pencillium chrsogenum, pencillium glabrum* and *fusarium oxysporum*. Further, many insects such as mites, fungi, molds and the like are a serious health hazard even when dead. Many people are allergic to the dust-like remains of these organisms that can also cause serious health problems. This is a particular problem to persons suffering from asthma, bronchitis, pneumoconious and other respiratory ailments.

Therefore, there is a continuing need for improved methods of killing organisms in enclosures such as buildings that are fully effective in killing and eliminating substantially all such organisms, is non-toxic, can be performed in a relatively short time, is clean, dry and odorless, and removes a large proportion of the dead organisms.

SUMMARY OF THE INVENTION

The above-noted problems, and others, are overcome in accordance with this invention by a method which basically comprises the steps of preparing the enclosure to be treated, such as a building by, removing all heat sensitive items, positioning heat shields, etc., positioning temperature indicating probes at appropriate locations, inserted into building structure, open spaces, etc., installing ingress ducts through which an environmentally acceptable gas, such as air, can be directed into the enclosure, allowing the gas to leave the enclosure by opening windows, doors, etc. or by installing an egress duct or ducts for this purpose, heating the gas and directing it into the ingress duct(s) when installed and filtering gas exhausting through open doors and windows and/or the egress ducts to collect organism remains and prevent them from entering the environment.

To increase system effectiveness, under some conditions, it is preferred that a suitable quantity of ozone be fed into the heated air passing through the ingress ducts. Ozone aids in killing many organisms and will eliminate any chemical fumes, odors, etc. that may result from the treatment.

To increase gas flow through the enclosure when egress ducts are employed, it is preferred that a vacuum extraction system be provided downstream of the filters receiving gas from the egress ducts. This will assure that almost all gas leaving the enclosure will pass through the filters and increase the capture of organism remains.

It is, therefore, an object of this invention to provide a non-toxic method for destroying a wide variety of organisms including fungi, toxic molds such as, but not limited to, *aspergillus oryzae, aspergillus terreus, aspergills versicolor, cladosporium hergbarum, stachybotrys chartarum, penicillium aurantiogriseum, pencillium chrsogenum, pencillium glabrum* and *fusarium oxysporum* and insects in enclosures such as buildings and the like.

Another object of the invention is to remove substantially all of the remains of the killed organisms from open areas in the enclosure.

Yet another object is to filter gases leaving from the enclosure to prevent the allergenic organism remains from entering the environment.

A further object is to accomplish the destruction of the organisms in a relatively short period.

Still another object is to monitor the temperature level throughout the enclosure to assure that all areas reach the predetermined effective temperature.

BRIEF DESCRIPTION OF THE INVENTION

Figure 2:
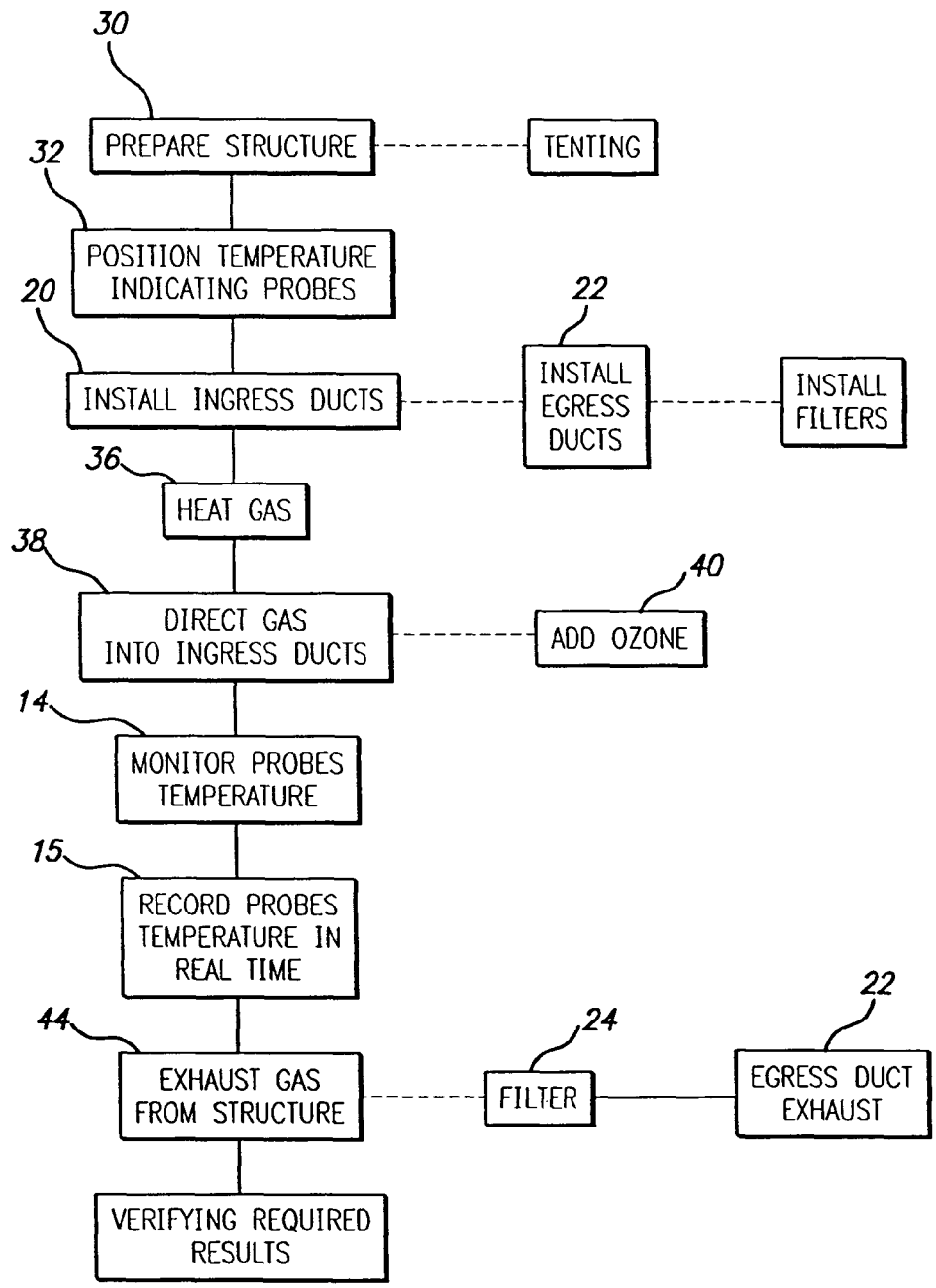

Details of preferred embodiments of the invention are provided in the drawings, wherein:

FIG. 1 is a schematic diagram showing components of the system of this invention; and FIG. 2 is a flow diagram of the method of this invention.

DETAILED DESCRIPTION OF PREFERRED EMBODIMENTS

Referring to FIG. 1, there is seen a schematic diagram showing the components of the kit of this invention in use treating an enclosure 10. Typically, enclosure 10 may be a house, barn, shed, a business building or some portion of such a building. An enclosure 11, such as, but not limited to conventional tenting may be required to treat the exterior surface of enclosure 10.

A plurality of temperature sensors 12 are positioned at predetermined locations to monitor temperature of the structure. Typically, these sensors have thin, elongated, tips that can be adhered to or pushed into wood or other materials or into suitable sized holes drilled into such material so as to measure the surface and/or internal temperature. Sensors 12 may be wired to a console 14 which displays and records the temperature at each sensor in real time for future reference. Alternatively, the sensors may be wireless or infrared, transmitting a signal to console 14. Typical sensors, as for way of example and not by way of limiting, include thermal couples, thermistors, or the like connected to a computer and/or a strip chart recorder. Thermocouples can be purchased from Togam under the model number 875F or any other commercial vendor having an equivalent sensor.

One or more heaters 16 heat a gas to the predetermined temperature. Preferably, the gas is air, although any other environmentally acceptable gas, such as nitrogen, may be used if desired. The gas is heated to at least a temperature lethal to the organisms to be destroyed. For a more complete disinfection, the gas temperature is preferably at least about 155° F., with optimum results generally be achieved with temperatures in the range of about 120 to 300° F.

Any suitable heater may be used. A gas burning heater, such as a conventional propane heater is preferred as being particularly efficient in heating air. Any other heating arrangement, such as electrical heaters, may be used if desired.

Heated gas from one or more heaters 16 is directed to a blower 18 (which may, if desired, be a component of the heater) which directs the hot gas into enclosure 10 through at least one ingress duct 20. Generally, a plurality of ducts 20 will be used to achieve the optimum distribution of hot gas throughout enclosure 10. Ingress ducts 20 preferably include variable flow dampers and may be moved while the system is in operation to achieve uniform temperatures in all areas being treated of the structure, as sensed by sensors 12 and observed at console 14.

When utilized, at least one egress duct 22 is provided to allow the gas to leave the structure. While it is preferred that enclosure 10 be maintained at a pressure slightly above atmospheric pressure as the hot gas brings the building elements up to the desired surface and penetration temperatures, the positive pressure differential allows the hot gas to vent through open windows, doors, etc. to and carries away the remains of the destroyed organisms upon venting. When the structure is sealed the duct or ducts 22, like the open windows and doors, caries away the remains of destroyed organisms. A filter assembly 24 receives gas from an egress duct 22 and removes the remains of the organisms preventing them from reaching the environment. Typical filters are available from Therma-Stor Products, Madison, Wis., under the Guardian HEPA system designation as for example and not by way of limitation, a UV filter is desired, however other filters suitable for the purpose intended can be utilized.

For optimum effectiveness, it is often desirable to increase gas flow rates by adding a blower 26 or other gas extraction means downstream of filter 24 to aid in extracting the gas from enclosure 10. This forced extraction increases the efficiency of filtering of the gas by filter 24.

In some applications, the introduction of ozone gas from ozone generator 28 into blower 18 or ingress duct 20 is highly desirable. This results in oxidation of organic contamination, such as molds where layering has occurred. Ozone generators suitable for use here are available from RGF $O^3$ Systems, Inc., under the TURBOZONE® trademark. Equivalent ozone generators suitable for the purpose intended can be used for the purpose.

In the operation of the system of this invention, the first step is to prepare the building, as indicated in block 30 of FIG. 2. This basically involves removing all heat sensitive items from the enclosure or, in some cases, covering heat sensitive items with thermal insulation material. All material that has a flash point below the maximum temperature to be used must be removed.

Next, a plurality of temperature indicating probes are placed in predetermined locations within the enclosure as indicated in block 32 to assure that the required temperature levels are achieved. In some cases the probes can be read directly, although preferably they are connected by wires or wireless means to a console, so that all probes can be monitored conveniently and the data recorded in real time.

At least one ingress duct and when the enclosure is sealed at least one egress duct are then installed as indicted in block 34. Generally, a plurality of ingress ducts is preferred. Although each duct may enter the enclosure separately, the use of one ingress entry duct connected to a manifold from which plural ducts extend to predetermined locations within the enclosure is preferred. When filtering the exiting gas, ducts may enter through any suitable opening, such as an open window or door with the remainder of the window or door blocked by a panel.

When everything is positioned, the gas (preferably air) is heated as indicated in block 36 and directed into the ingress duct(s), as indicated in block 38. If desired, ozone can be optionally added to the gas stream at this point, as indicated in block 40.

Air leaving through egress ducts may be filtered to remove the remains of the destroyed organisms, as indicated in block 42. The filter system will inherently impose some back pressure on the egress ducts and enclosure. Back pressure is desirable to assure surface exposure and penetration of the heated gas to all parts of the enclosure, but excessive back pressure should be avoided. Therefore, it is generally desirable that an air extraction system, as indicated in block 44, be included to increase air flow through the filter system and limit back pressure.

At any time during system operation, the ingress and egress ducts may be moved to assure uniform temperatures throughout the structure, as indicated by the temperature probes and temperature monitoring console.

Flow of the heated air through the enclosure will generally be continued for about 1 to 6 hours to provide optimum results. Usually the entire operation from preparation of the building to removal of the equipment will take six to eight hours.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A method for killing organisms and removing of toxic substances from an enclosure, which comprises the steps of:
   providing at least one ingress duct communicating with said interior of said enclosure;

heating an environmentally acceptable gas to a temperature lethal to organisms comprising insects and at least one of fungi and bacteria;

directing said heated gas into said enclosure through said at least one ingress duct for a time sufficient to raise the temperature of said enclosure to said lethal temperature to thereby kill said organisms;

applying a pressure differential to said enclosure relative to atmospheric pressure to draw said heated gas out of said enclosure;

filtering said heated gas to remove from said enclosure any fine particulate remains from said organisms that are suspended in the heated gas; and exhausting said filtered heated gas from said enclosure to an external environment such that the particulate remains are substantially removed from said heated gas before its exhaustion.

2. The method according to claim 1, wherein said extracting step further includes passing said heated gas through a HEPA filter.

3. A method for sanitizing an enclosed structure having an exterior and an interior, comprising the steps of:

disposing at least one temperature-indicating device within said enclosed structure;

heating a gas;

directing heated gas within said enclosed structure so as to maintain a flow of said heated gas within said enclosed structure;

monitoring the temperature within said enclosure using said at least one temperature-indicating device during at least a portion of said directing step, to determine when said enclosed structure reaches a sufficiently high temperature for sanitizing said enclosed structure;

filtering said heated gas to remove suspended particulates in the heated gas from said enclosed structure during at least a substantial portion of said directing step; and exhausting said heated gas from said enclosed structure by applying a vacuum to said enclosed structure so as to draw the suspended particulates out of said enclosed structure, wherein the suspended particulates are substantially removed from said heated gas before exhaustion from said enclosure.

4. The method according to claim 3, wherein said sufficiently high temperature is at least about 120° F.

5. The method according to claim 3, wherein said filtering step further comprises passing said heated gas through a HEPA filter.

6. The method according to claim 3, wherein said filtering step further comprises drawing a vented portion of said heated gas through a filter.

7. A method for exterminating toxic organisms in a structure, said method comprising the steps of:

heating a gas;

directing said heated gas in an interior portion of an enclosed structure so as to heat at least said interior portion to a temperature that is hot enough, when maintained for a period of time, to kill toxic organisms comprising at least one of fungi and bacteria;

maintaining an interior of said enclosed structure at not less than said temperature for not less than said period of time; and filtering said heated gas from said enclosed structure during at least a substantial portion of said maintaining step using a filter operable to capture suspended remains of said toxic organisms; and exhausting said heated gas from said enclosed structure by applying a vacuum to said enclosed structure so as to draw the suspended remains out of said enclosure, wherein the suspended particulates are substantially removed from said heated gas before exhaustion from said enclosure.

8. The method according to claim 7, wherein said temperature is at least about 120° F.

9. The method according to claim 7, further comprising disposing at least one temperature-indicating probe to monitor temperature at at least one location within said enclosed structure.

10. The method according to claim 9, further comprising connecting said at least one temperature-indicating probe to a console disposed outside said enclosed structure.

11. The method according to claim 7, wherein said filtering step further comprises passing said heated gas through said filter, said filter comprising a HEPA filter.

12. The method according to claim 7, wherein said filtering step further comprises drawing said heated gas through the filter using a downstream blower.

13. The method according to claim 7, wherein said filtering step further comprises removing said heated gas from said interior portion of said structure during at least a portion of said filtering step.

14. The method of claim 13, further comprising returning filtered gas to said interior portion after said filtering step.

15. The method of claim 7, wherein the exhausting step further comprises applying a suction downstream of said filter.

16. The method of claim 7, wherein said heating step is performed outside said enclosed structure.

17. The method of claim 7, wherein said directing step further comprises directing said heated gas into said interior portion using at least one duct.

18. The method of claim 7, wherein said maintaining step further comprises maintaining said temperature for not less than about one hour.

19. The method of claim 1, further comprising covering heat sensitive items within the enclosure with thermal insulation material.

20. The method of claim 1, further comprising remotely monitoring temperature within said enclosure.

21. The method of claim 20, wherein the monitoring further comprises communicating at least one temperature signal wirelessly to a console located outside said enclosure.

22. The method of claim 3, wherein the monitoring step further comprises communicating at least one temperature signal wirelessly to a console located outside the enclosed structure.

23. The method of claim 3, further comprising covering heat sensitive items within the enclosed structure with thermal insulation material.

24. The method of claim 7, further comprising covering heat sensitive items within the enclosed structure with thermal insulation material.

25. The method of claim 1, further comprising monitoring temperature at at least one location within the enclosure.

26. The method of claim 25, wherein the monitoring further comprises disposing at least one temperature-sensitive probe within the enclosure.

27. The method of claim 26, wherein the monitoring further comprises communicating a signal from the at least one temperature-sensitive probe to a console located outside the enclosure.

28. The method of claim 7, further comprising monitoring temperature at at least one location within the structure.

29. The method of claim 28, wherein the monitoring further comprises disposing at least one temperature-sensitive probe within the structure.

30. The method of claim 29, wherein the monitoring further comprises communicating a signal from the at least one temperature-sensitive probe to a console located outside the structure.

* * * * *